UNITED STATES PATENT OFFICE.

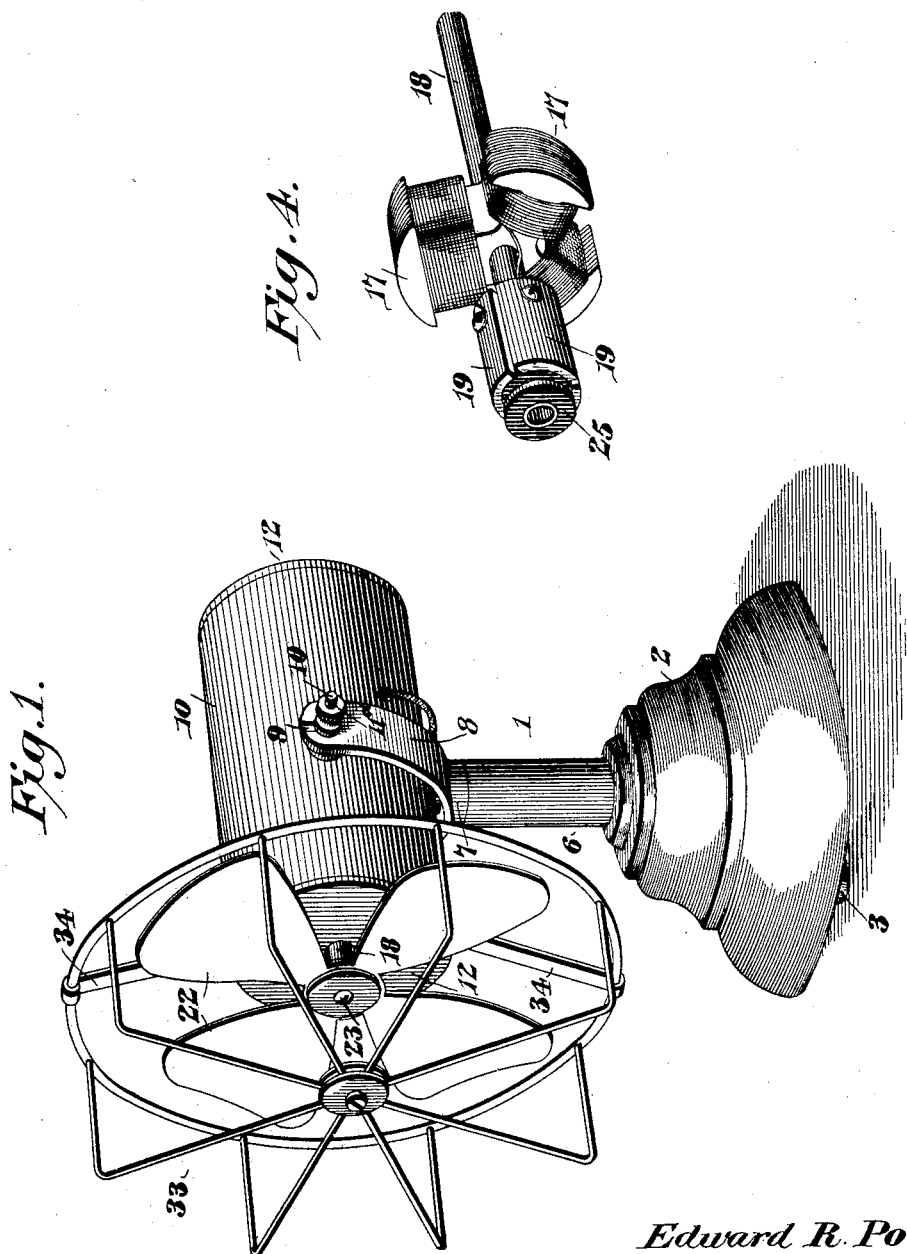

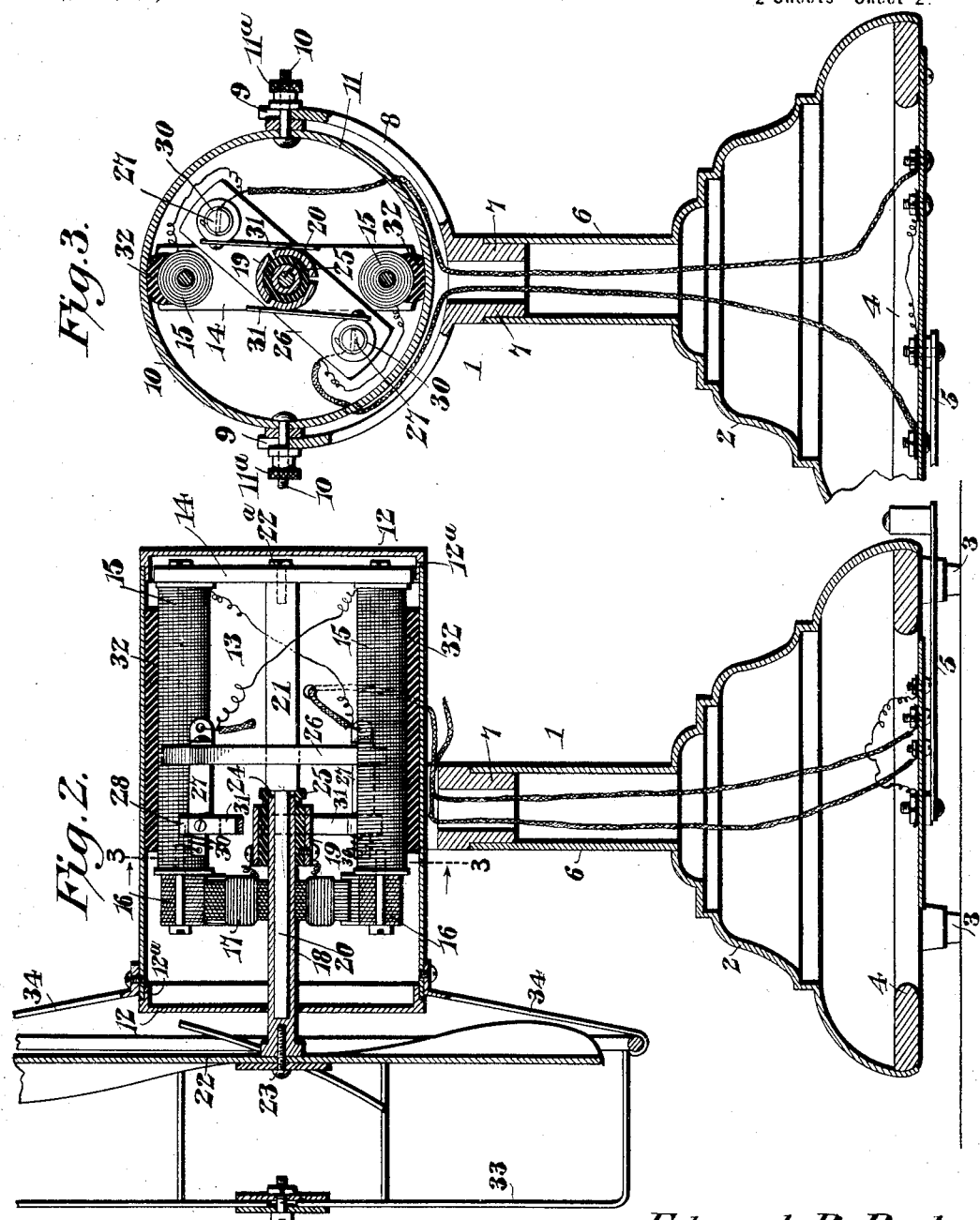

EDWARD R. POST AND FREDERICK WRIGHT, OF NEWBURGH, NEW YORK.

PORTABLE ELECTRIC FAN.

SPECIFICATION forming part of Letters Patent No. 673,139, dated April 30, 1901.

Application filed May 26, 1900. Serial No. 18,109. (No model.)

*To all whom it may concern:*

Be it known that we, EDWARD R. POST and FREDERICK WRIGHT, citizens of the United States, residing at Newburgh, in the county of Orange and State of New York, have invented a new and useful Portable Electric Fan, of which the following is a specification.

This invention relates to fans of that type which are driven by electric motors and are commonly known as "electric" fans; but the special object of the present invention is to provide a fan of this character having the parts arranged in a minimum space and compactly located, so as to form a light and portable structure, capable of easy handling, and especially useful as a table or desk fan, as well as for the bedroom.

To this end the invention contemplates certain novel and practical structural improvements especially adapting a simple form of direct-current motor for use in connection with a novel and practical form of portable stand, whereby a maximum efficiency may be obtained in a comparatively small fan.

A further object of the invention is to so construct and arrange the parts as to specially adapt the fan for use in connection with dry-cell batteries, and thus secure a practical form of "battery-fan," which will run at an effective rate of speed for as long periods as power electric fans are usually run.

Other objects reside in the novel means of mounting and centering the armature of the motor, the detachable mounting of such motor in its inclosing case or shell, and the adjustable support of the latter to provide for the desired tilt or adjustment of the rotating fan member.

With these and many other objects in view, which will more readily appear as the nature of the invention is better understood, the same consists in the novel construction, combination, and arrangement of parts hereinafter more fully described, illustrated, and claimed.

The essential features of the invention are necessarily susceptible to some modification without departing from the spirit or scope thereof; but the preferred embodiment thereof is shown in the accompanying drawings, in which—

Figure 1 is a perspective view of a portable electric fan constructed in accordance with the present invention. Fig. 2 is a vertical longitudinal sectional view thereof. Fig. 3 is a vertical cross-sectional view on the line 3 3 of Fig. 2. Fig. 4 is a detail in perspective of the removable armature and its sleeve shaft or spindle.

Like numerals of reference designate corresponding parts in the several figures of the drawings.

In carrying out the invention the improvements are preferably associated with a suitable stand which provides for the convenient support of all the parts, while at the same time permitting of the convenient handling of the fan and the placing thereof upon a desk, table, or other support where it is desired to have the same located. The preferable construction of portable stand is shown in the drawings and is designated by the numeral 1. This stand essentially consists of a hollow ornamental base portion 2, forming a rest for the fan and provided with suitable supporting-feet 3, besides having therein a supporting member 4 for the controlling-switch 5 of the motor. As this controlling-switch may be of any suitable construction, special reference thereto is unnecessary. Besides the hollow ornamental supporting-base 2 the supporting-stand is provided with a tubular standard 6, arising from the crown of the base 2 and receiving in the upper open end thereof the shouldered attaching-collar 7, projecting from the central under side of the open supporting-yoke 8. The open supporting-yoke 8 is preferably of an approximate U shape and is provided at the terminals of its opposite arms with the bearing-notches 9, receiving therein the trunnion-bolts 10, fitted to and projecting outwardly from diametrically opposite sides of the motor-casing 11. The threaded portions of said trunnion-bolts 10 receive thereon the clamping-nuts 11ª, which bind upon the outer sides of the supporting-yoke 8 and serve to hold the motor-casing rigid in its adjusted position. By loosening the nuts 11ª, so as to permit the trunnion-bolts 10 to freely turn in the bearings 9 thereof, the said motor-casing may be moved upon the bolts as an axis, and thereby tilted to any degree, according to the desired adjustment of the fan. This tilting adjustment of the motor-casing 10 is a very useful feature of the invention, inasmuch as it permits the operator to give the desired deflection to the draft of air from the fan.

The motor-casing 10 preferably consists of a cylindrical metal shell open at both ends and designed to have its open ends covered by the removable end caps 12, which are preferably of a flanged formation, with their flanges 12ᵃ fitting within the open ends of the casing and held therein by frictional engagement or supplemental fastening means, should the latter be found necessary or desirable. In the drawings, however, the removable caps 12 are shown fitted to the ends of the casing by simply a slip-joint, which under ordinary conditions has been found effective, besides permitting of the ready removal of the caps when it is desired to remove or replace the electric motor 13, which is detachably housed within the casing.

The electric motor 13 is a simple type of direct-current motor, and the windings thereof are made with special reference to adapting the same for use with dry-cell batteries. Inasmuch as the present invention has special reference to the construction of a portable battery-fan, the general parts of the motor are necessarily the same as those of any other electric motor; but in carrying out the present invention the motor 13 is constructed of a size so as to removably yet snugly fit within the cylindrical motor-casing 10, which casing occupies an approximately horizontal position. It is also necessary to construct and arrange the parts of the motor whereby the same will be effective in its operation when in horizontal or approximately horizontal position.

Referring more specifically to the construction of the motor, it will be observed that the same essentially comprises a rectangular field-frame 14, carrying the opposite longitudinally-arranged parallel fields 15, which are disposed longitudinally of the casing within which the motor is arranged and which carry at one end the pole-pieces 16. These pole-pieces 16 at one end of the opposite fields 15 are arranged in opposite relation in the usual way, but are preferably of a laminated formation and are designed to coöperate with the rotating armature-body 17, working in the space between the pole-pieces 16, and whose axis of rotation is disposed longitudinally of the fields instead of at right angles thereto, as is commonly the case in motors of a similar type.

The rotating armature-body 17, which is arranged to rotate between the oppositely-located pole-pieces 16, may be of any preferred type having suitable windings for a dry-cell current; but in the present invention the said armature-body is rigidly mounted upon a sleeve-shaft 18, which also carries the commutator-disk 19, arranged at one side of the armature-body 17 and wired therewith in the usual way. The sleeve-shaft 18 for the armature extends a material distance beyond the body portion 7 thereof and has a long bearing upon the reduced bearing-stem 20 of a stationary armature-support or supporting-spindle 21. This armature-supporting spindle 21 is arranged longitudinally of the field-frame, centrally between and parallel with the oppositely-located fields 15 thereof, and is rigidly fastened by any suitable means, as at 22ᵃ, to the yoke-bar 14ᵃ of the field-frame, as plainly shown in Fig. 2 of the drawings. The stationary supporting-spindle 21 has the reduced bearing-stem 20 thereof extending from a point within the field-frame to a point materially beyond the same, so that the sleeve-shaft of the armature will have an exceedingly long bearing thereon and will thereby be braced against play or vibration, thus insuring a steady and uniform rotation of the fan proper, 22, which is held by the screw 23 or other equivalent means detachably upon the outer extremity of the sleeve-shaft 18. At the junction of its main portion with the reduced stem 20 the said stationary supporting-spindle 21 is provided with a bearing-shoulder 24, against which bears the insulating-collar 25, fitted to the inner extremity of the sleeve-shaft 18, and not only serving to take up all wear at this point, but also serving, in connection with the sleeve, of brass or other non-magnetic material, upon which the armature is mounted, as an insulation for the magnetic currents, thereby insulating the armature-shaft from stray magnetic currents, either from the fields or their yoke.

To provide for the support of the commutator-brushes, a supporting cross-bar 26 is fitted to the stationary spindle 21 and extends diagonally across the field-frame, so as to clear the fields 15, as shown in Fig. 3 of the drawings. At its opposite ends the said supporting-bar 26 has projected from one side thereof the posts 27, on which are loosely mounted the axially-movable brush-holders 28, with which are connected the springs 30, also connected with the posts 27 and serving to normally hold the brushes 31 upon the periphery of the commutator 19, said brushes 31 being attached to the holders 28 therefor by any suitable means. It is of course understood that the separate brushes are arranged in opposite relation, respectively, upon opposite sides of the commutator.

In connection with the mounting of the electric motor within the casing 10 an important feature of the invention resides in the employment of packing-strips 32, made of rubber packing or equivalent material and designed to be interposed between the diametrically opposite sides of the motor and the contiguous sides of the motor-casing. The motor is arranged between the oppositely-located packing-strips 32, and said strips therefore not only serve to detachably retain the motor within the casing, but at the same time serve as cushions to absorb the vibrations thereof, and thus entirely obviate rattling or noise of any kind. The motor is thus practically rendered noiseless in its operation, and the packing-strips 32 serve the additional function of insulating the motor completely from its metallic casing or shell.

To complete the equipment of the fan, the rotating fan member 22 is preferably incased within a wire or skeleton guard 33, detachably sustained upon one end of the motor casing or shell by suitable supporting-brackets 34.

From the foregoing it is thought that the construction, operation, and many advantages of the herein-described electric fan will be readily apparent to those familiar with the art without further description, and it will be understood that changes in the form, proportion, and minor details of construction may be resorted to without departing from the principle or sacrificing any of the advantages of this invention.

Having thus described the invention, what is claimed as new, and desired to be secured by Letters Patent, is—

1. A motor of the class described, comprising a field-frame having a stationary longitudinally-arranged supporting-spindle provided with an extended stem and an intermediate bearing-shoulder, a rotating armature, a sleeve-shaft for the armature and mounted upon said extended stem of the spindle and coöperating with the shoulder thereof, said sleeve-shaft carrying the commutator, a cross-bar mounted on the supporting-spindle at one side of the bearing-shoulder, and brush-holders carried by said cross-bar.

2. A motor of the class described, comprising a field-frame having a stationary longitudinally-arranged supporting-spindle provided with an intermediate bearing-shoulder, a sleeve-shaft for the armature and mounted upon the spindle, said sleeve-shaft also carrying the commutator and provided with an insulating-collar working against said bearing-shoulder.

3. In an electric fan, the fan-motor comprising a field-frame having a stationary longitudinally-arranged supporting-spindle, provided with an extended bearing-stem and an intermediate bearing-shoulder, the rotating armature, a sleeve-shaft for the armature carrying the fan at one end, and the commutator at its opposite end, said sleeve-shaft also being provided contiguous to the commutator with a terminal insulating-collar working upon said bearing-shoulder, and brushes supported by the field-frame and coöperating with the commutator.

4. In an electric fan, the fan-motor comprising a field-frame having a stationary longitudinally-arranged supporting-spindle, the rotating armature, a sleeve-shaft for said armature carrying the fan, and the commutator, and journaled upon the supporting-spindle, a cross-bar mounted on the supporting-spindle and carrying oppositely-arranged posts, and spring-pressed axially-movable brush-holders mounted upon said posts and carrying the brushes for the commutator, substantially as set forth.

5. In an electric fan, the motor-casing, the fan-motor removably mounted within the casing and having no direct connection therewith, and yielding packing-strips interposed between the diametrically opposite portions of the motor and the contiguous sides of the casing to serve as insulators and also as wedges to provide a detachable slip-joint connection between the motor and the casing.

6. In an electric fan, the portable upright stand having a supporting-yoke, a horizontally-arranged motor-casing trunnioned within said yoke and provided with open ends, removable closures for the open ends of the casing, and a fan-motor mounted within the casing and removable from either end thereof.

In testimony that we claim the foregoing as our own we have hereto affixed our signatures in the presence of two witnesses.

EDWARD R. POST.
FREDERICK WRIGHT.

Witnesses:
E. E. ROOCO,
NELLIE D. THEALL.